W. J. REGAR.
SANITARY DRINKING FOUNTAIN FOR HORSES AND CATTLE.
APPLICATION FILED DEC. 19, 1912.
1,064,540.
Patented June 10, 1913.
2 SHEETS—SHEET 1.
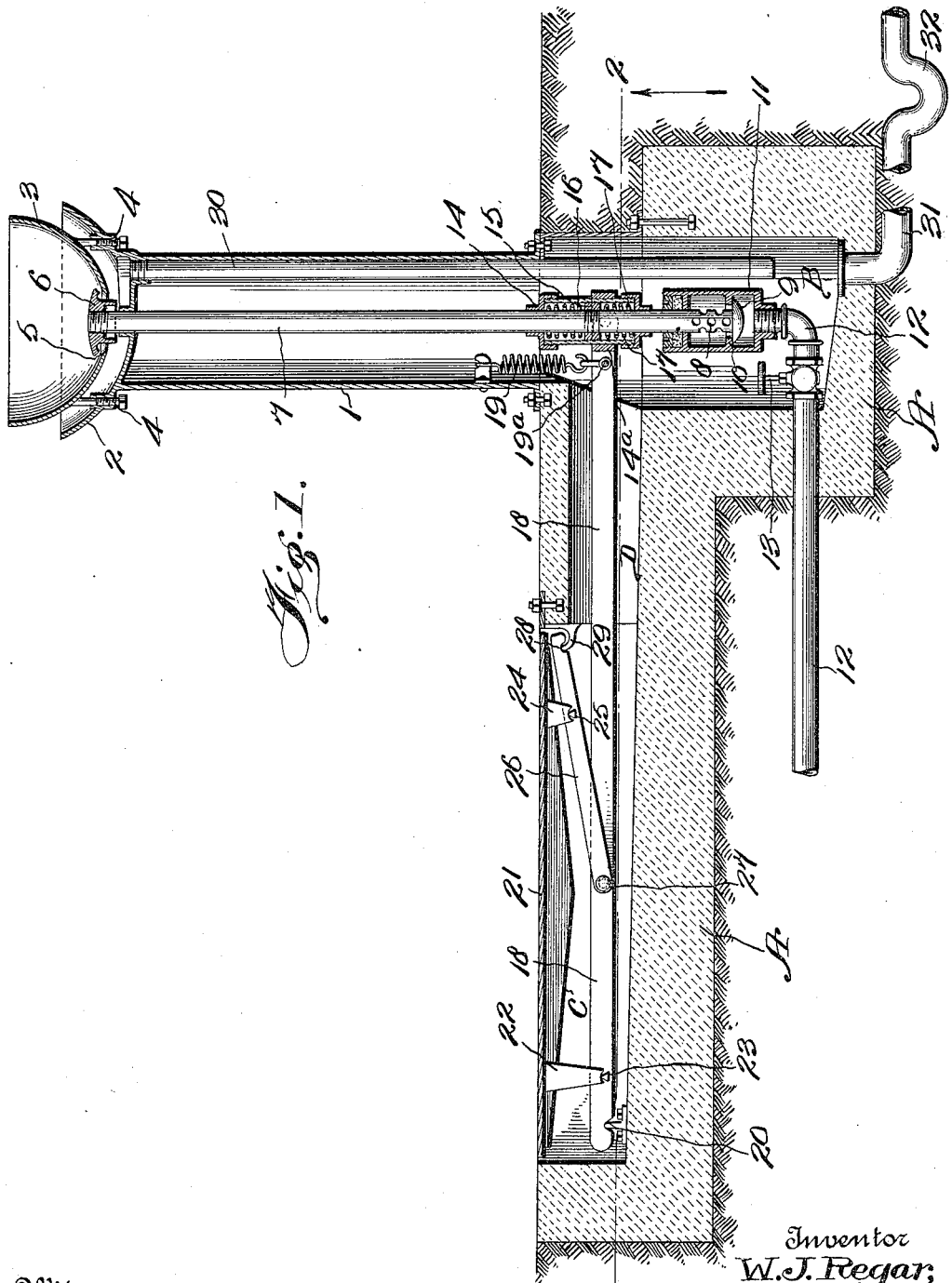
Witnesses
W. Max Duvall
Edwin J Beller
Inventor
W. J. Regar;
by Wilkinson, Witherspoon
& MacKaye,
Attorneys W. J. REGAR.
SANITARY DRINKING FOUNTAIN FOR HORSES AND CATTLE.
APPLICATION FILED DEC. 19, 1912.
1,064,540.
Patented June 10, 1913.
2 SHEETS—SHEET 2.
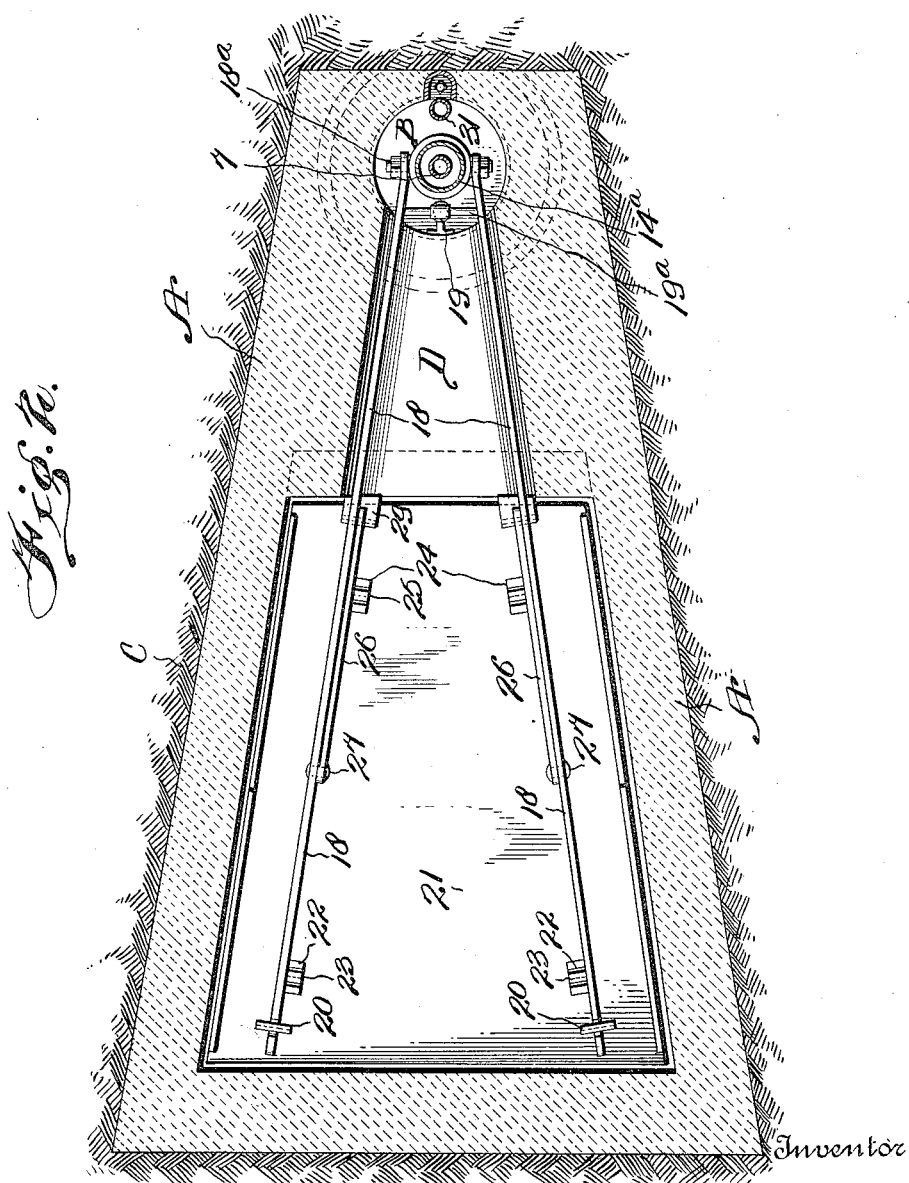

UNITED STATES PATENT OFFICE.

WILLIAM JOHN REGAR, OF TAMPA, FLORIDA.

SANITARY DRINKING-FOUNTAIN FOR HORSES AND CATTLE.

1,064,540. Specification of Letters Patent. Patented June 10, 1913.

Application filed December 19, 1912. Serial No. 737,717.

*To all whom it may concern:*

Be it known that I, WILLIAM JOHN REGAR, a citizen of the United States, residing at Tampa, in the county of Hillsboro and State of Florida, have invented certain new and useful Improvements in Sanitary Drinking-Fountains for Horses and Cattle; and I do hereby declare the following to be a full, clear, and exact description of the invention, such as will enable others skilled in the art to which it appertains to make and use the same.

My invention relates to an improved sanitary drinking fountain for stock.

It is intended to provide a simple, cheap, and effective arrangement, which is automatically operated by the approach of the animal to the fountain, and is automatically released by the withdrawal of the animal from the same.

The fundamental idea of the invention is to provide a separate supply of liquid for each animal as it uses the fountain, to cleanse the fountain after the use of the same by the animal, and to replace the parts in the initial position, ready for use on a subsequent occasion.

My invention will be understood by reference to the accompanying drawings, in which the same parts are indicated by the same letters and numerals throughout the several views.

Figure 1 shows a central vertical section through the apparatus, and the foundations surrounding the same, parts being shown in elevation; and Fig. 2 shows a section along the line 2—2 of Fig. 1, and looking upward, the parts being shown in the inverted position.

In installing the apparatus, a suitable mass of cement or concrete A is so arranged in the earth as to provide a drain chamber B, a platform chamber C, and a passage D, connecting the two chambers B and C; but I do not mean to limit the invention to any particular arrangement of foundation, concrete chambers, or the like.

Mounted upon a suitable foundation, is a pedestal 1, preferably in the form of a cylindrical shell, above which pedestal I provide a catch basin 2, above which is mounted the drinking bowl 3, which may be of metal enameled with porcelain, or any other suitable material. This drinking bowl is mounted at the required distance above the catch basin 2, and for convenience of adjustment, I provide adjusting screws 4; but any other suitable device for this purpose may be adopted, if desired. It will be seen that the adjustment of the bowl, as indicated, will raise or lower the valve seat 5 in the bottom of the bowl, thereby limiting the travel of the valve stem 7, carrying the valves 6 and 10.

The drinking bowl 3 is open at its bottom, and is provided with a valve seat 5, adapted to register with the valve 6, carried by the supply pipe 7, which pipe is perforated near its lower end, as at 8, and carries at said lower end a cap or valve 9, which seats on the valve seat 10, in the cylindrical box 11, which is attached to the open end of the main water supply pipe 12, the flow through which pipe is controlled by any suitable valve 13, located in any desired position. While I have shown the valve 13 located in the chamber B, it will be obvious that the same may be located in any desired position with regard to the pipe 12. Slidably mounted on the pipe 7, is a cylindrical casing 14, inclosing the piston 15, fast to the pipe 7, above and below which are springs 16 and 17, the arrangement forming a dash pot, as will be hereinafter described.

Instead of the arrangement just described, any suitable dash pot arrangement may be used, if desired.

Secured to the casing 14, is a band 14ª, which is connected in any suitable way, as by the bolts and nuts 18ª, to the lever bars 18, the forward ends of which bars are normally held in the raised position by means of the spring 19, connected to the cross bar 19ª, spanning the bars 18. These lever bars are pivoted, as at 20, and carry the platform 21, which is supported from said lever bars in any convenient way, as by means of the legs 22 and 24, engaging, respectively, the knife edges 23 and 25, the former carried by the levers 18, and the latter carried by the bars 26, pivoted at 27 to said levers 18. These bars 26 are provided with hooked ends 28, to engage the hooks 29 carried by the foundation. The catch basin 2 is provided with an over-flow pipe 30, which opens down into the waste chamber B; and the latter is provided with a drain pipe 31, which is preferably provided with a suitable trap 32. The bottoms of the platform chamber C, of the connecting passage D, and of the waste chamber B, are all preferably inclined toward the drain pipe 31; and thus any leakage from any part of the apparatus is carried off by said drain pipe.

The operation of the device is as follows:—The animal being directed upon the platform 21, its weight, acting on the knife edges 23 and 25, presses down the lever bars 18 against the action of the spring 19; and the sudden application of the weight is taken care of by the dash pot arrangement 14, supplemented by the tensile strength of the spring 19, the result being that the pressure is gradually but effectively applied to the piston 15, carried by the pipe 7. This forces the valve 9 down below its seat 10, and permits an influx of water through the supply pipe 12, which, passing up through the pipe 7, flows into the bowl 3. Should the animal remain on the platform after the bowl 3 is filled, said bowl will overflow, the overflow passing into the catch basin 2; and passing down through the pipe 30, will flow into the chamber B, and will be carried off by the drain pipe 31. As long as the animal remains on the platform, the flow of water will continue; and as soon as it leaves the platform, the spring 19, supplemented by the spring 17, will lift the pipe 7, closing the valve 9, and lifting the valve 6, opening the passage through the bottom of the bowl 3, and permitting said bowl to automatically empty itself into the catch basin 2, when the parts will remain in the position shown in Fig. 1, ready for the approach of another animal.

It will thus be seen that the drinking bowl 3 is automatically filled with water every time an animal, of sufficient weight, moves onto the platform 21; and that said bowl is automatically emptied every time the weight of the animal is removed from said platform. It is also obvious that the apparatus is so arranged as to be simple and effective in use; that it is not likely to get out of order; and that all the operative parts are protected against accidental injury by being inclosed in the pedestal, or in the chambers hereinbefore described. Another advantage of the herein described arrangement is that the supply pipe 12, being embedded in the earth, will deliver the water to the stock in warm weather in a more or less cool condition; and it will also be protected against freezing in cold weather. The apparatus, therefore, is especially adapted for use either in hot or cold climates.

It will be obvious that various modifications might be made in the herein described construction, and in the combination and arrangement of parts, which could be used without departing from the spirit of my invention.

Having thus described my invention, what I claim and desire to secure by Letters Patent of the United States is:—

1. A sanitary fountain for stock, comprising a hollow pedestal, a catch basin carrier thereby, a drinking bowl mounted above said catch basin, and having an opening in its bottom, with a valve seat around said opening, a supply pipe slidably mounted in said pedestal and carrying a valve adapted to close the opening in the bottom of said bowl when the supply pipe is in the lowered position, a second valve carried at the lower end of said supply pipe and closing the same, said supply pipe being provided with perforations above said valve, a water main connected to any suitable source of water supply, a supply box connected to said water main, and provided with a valve seat closed by the valve on the lower end of said supply pipe when said pipe is in the raised position, and means adapted to be operated by the weight of the animal for moving said supply pipe down to the lowered position, with independent means for restoring the parts to the initial position, substantially as described.

2. A sanitary fountain for stock, comprising a hollow pedestal, a catch basin carried thereby, a drinking bowl mounted above said catch basin, and having an opening in its bottom, with a valve seat around said opening, means for adjusting the position of said drinking bowl relative to said catch basin, a supply pipe slidably mounted in said pedestal and carrying a valve adapted to close the opening in the bottom of said bowl when the supply pipe is in the lowered position, a second valve carried at the lower end of said supply pipe and closing the same, said supply pipe being provided with perforations above said valve, a water main connected to any suitable source of water supply, a supply box connected to said water main, and provided with a valve seat closed by the valve on the lower end of said supply pipe when said pipe is in the raised position, and means adapted to be operated by the weight of the animal for moving said supply pipe down to the lowered position, with independent means for restoring the parts to the initial position, substantially as described.

3. A sanitary fountain for stock, comprising a drinking bowl having an opening in its bottom, with a valve seat around said opening, a supply pipe slidably mounted relative to said bowl, and carrying a valve adapted to close the opening in the bottom of said bowl when the supply pipe is in the lowered position, a second valve carried at the lower end of said supply pipe and closing the same, said supply pipe being provided with perforations above said valve, a water main connected to any suitable source of water supply, a supply box connected to said water main, and provided with a valve seat closed by the valve on the lower end of said supply pipe when said pipe is in the raised position, and means adapted to be operated by the weight of the animal for moving said supply pipe down to the lowered position, with independent means for restoring the parts to the initial position, substantially as described.

4. A sanitary fountain for stock, comprising a drinking bowl having an opening in its bottom, with a valve seat around said opening, a supply pipe slidably mounted relative to said bowl, and carrying a valve adapted to close the opening in the bottom of said bowl when the supply pipe is in the lowered position, a second valve carried at the lower end of said supply pipe and closing the same, said supply pipe being provided with perforations above said valve, a water main connected to any suitable source of water supply, a supply box connected to said water main, and provided with a valve seat closed by the valve on the lower end of said supply pipe when said pipe is in the raised position, a platform and levers adapted to be operated by the weight of the animal for moving said supply pipe down to the lowered position, with independent means for restoring the parts to the initial position, substantially as described.

5. A sanitary fountain for stock, comprising a drinking bowl having an opening in its bottom, with a valve seat around said opening, a supply pipe slidably mounted relative to said bowl and carrying a valve adapted to close the opening in the bottom of said bowl when the supply pipe is in the lowered position, a second valve carried at the lower end of said supply pipe and closing the same, said supply pipe being provided with perforations above said valve, a water main connected to any suitable source of water supply, a supply box connected to said water main, and provided with a valve seat closed by the valve on the lower end of said supply pipe when said pipe is in the raised position, a platform and levers adapted to be operated by the weight of the animal for moving said supply pipe down to the lowered position, with a spring for restoring the parts to the initial position, substantially as described.

6. A sanitary fountain for stock, comprising a hollow pedestal, a catch basin carried thereby, a drinking bowl mounted above said catch basin, and having an opening in its bottom, with a valve seat around said opening, means for adjusting the position of said drinking bowl relative to said catch basin, a supply pipe slidably mounted in said pedestal and carrying a valve adapted to close the opening in the bottom of said bowl when the supply pipe is in the lowered position, a second valve carried at the lower end of said supply pipe and closing the same, said supply pipe being provided with perforations above said valve, a water main connected to any suitable source of water supply, a supply box connected to said water main, and provided with a valve seat closed by the valve on the lower end of said supply pipe when said pipe is in the raised position, and a platform and levers adapted to be operated by the weight of the animal for moving said supply pipe down to the lowered position, with a spring for restoring the parts to the initial position, substantially as described.

7. A sanitary fountain for stock, comprising a drinking bowl having an opening in its bottom, with a valve seat around said opening, a supply pipe slidably mounted relative to said bowl and carrying a valve adapted to close the opening in the bottom of said bowl when the supply pipe is in the lowered position, a dash pot arrangement carried by said supply pipe, a second valve carried at the lower end of said supply pipe and closing the same, said supply pipe being provided with perforations above said valve, a water main connected to any suitable source of water supply, a supply box connected to said water main, and provided with a valve seat closed by the valve on the lower end of said supply pipe when said pipe is in the raised position, a platform adapted to support the animal, and a system of levers connecting said platform and said dash pot arrangement, for moving said supply pipe down to the lowered position, with independent means for restoring the parts to the initial position, substantially as described.

8. A sanitary fountain for stock, comprising a drinking bowl having an opening in its bottom, with a valve seat around said opening, a supply pipe slidably mounted relative to said bowl and carrying a valve adapted to close the opening in the bottom of said bowl when the supply pipe is in the lowered position, a dash pot arrangement carried by said supply pipe, a second valve carried at the lower end of said supply pipe and closing the same, said supply pipe being provided with perforations above said valve, a water main connected to any suitable source of water supply, a supply box connected to said water main, and provided with a valve seat closed by the valve on the lower end of said supply pipe when said pipe is in the raised position, a platform adapted to support the animal, and a system of levers connecting said platform and said dash pot arrangement, for moving said supply pipe down to the lowered position, with a spring for restoring the parts to the initial position, substantially as described.

9. A sanitary fountain for stock, comprising a drinking bowl having an opening in its bottom, with a valve seat around said opening, a supply pipe slidably mounted relative to said bowl and carrying a valve adapted to close the opening in the bottom of said bowl when the supply pipe is in the lowered position, a dash pot arrangement carried by said supply pipe, a water main connected to any suitable source of water supply, means operated by the downward movement of said supply pipe for connecting same to said water main, a platform adapted to support the animal, and a system of levers connecting said platform and said dash pot arrangement, for moving said supply pipe down to the lowered position, with a spring for restoring the parts to the initial position, substantially as described.

10. A sanitary fountain for stock, comprising a drinking bowl having an opening in its bottom, with a valve seat around said opening, a supply pipe slidably mounted relative to said bowl and carrying a valve adapted to close the opening in the bottom of said bowl when the supply pipe is in the lowered position, a dash pot arrangement carried by said supply pipe, a water main connected to any suitable source of water supply, means operated by the downward movement of said supply pipe for connecting same to said water main, a platform adapted to support the animal, and a system of levers connecting said platform and said dash pot arrangement, for moving said supply pipe down to the lowered position, with means for restoring the parts to the initial position, substantially as described.

11. A sanitary fountain for stock, comprising a drinking bowl having an opening in its bottom, with a valve seat around said opening, a supply pipe slidably mounted relative to said bowl, and carrying a valve adapted to close the opening in the bottom of said bowl when the supply pipe is in the lowered position, a water main connected to any suitable source of water supply, means operated by the downward movement of said supply pipe for connecting same to said water main, and means adapted to be operated by the weight of the animal for moving said supply pipe down to the lowered position, with independent means for restoring the parts to the initial position, substantially as described.

12. A sanitary fountain for stock, comprising a drinking bowl having an opening in its bottom, with a valve seat around said opening, a supply pipe slidably mounted relative to said bowl, and carrying a valve adapted to close the opening in the bottom of said bowl when the supply pipe is in the lowered position, a water main connected to any suitable source of water supply, means operated by the downward movement of said supply pipe for connecting same to said water main, a platform and levers adapted to be operated by the weight of the animal for moving said supply pipe down to the lowered position, with independent means for restoring the parts to the initial position, substantially as described.

In testimony whereof, I affix my signature, in presence of two witnesses.

WILLIAM JOHN REGAR.

Witnesses:
　SAML. M. REGAR,
　ALVIN L. FRANKLIN.